(12) United States Patent
Cottler et al.

(10) Patent No.: US 7,850,455 B2
(45) Date of Patent: Dec. 14, 2010

(54) ANATOMICAL MODEL AND METHOD FOR MEDICAL TRAINING

(75) Inventors: Shayn Peirce Cottler, Charlottesville, VA (US); Bradley W. Kesser, Charlottesville, VA (US); Brian B. Hughley, Charlottesville, VA (US); Meg G. Keeley, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 654 days.

(21) Appl. No.: 11/826,621

(22) Filed: Jul. 17, 2007

(65) Prior Publication Data
US 2008/0050710 A1 Feb. 28, 2008

Related U.S. Application Data

(60) Provisional application No. 60/831,393, filed on Jul. 17, 2006.

(51) Int. Cl.
*G09B 23/28* (2006.01)
(52) U.S. Cl. ........................ 434/270; 434/262; 434/267; 434/268
(58) Field of Classification Search ................. 434/270, 434/262, 267–268
See application file for complete search history.

(56) References Cited

U.S. PATENT DOCUMENTS

| 2,778,125 | A | * | 1/1957 | Hantman | 434/270 |
|---|---|---|---|---|---|
| 5,053,040 | A | * | 10/1991 | Goldsmith, III | 606/109 |
| 5,505,623 | A | * | 4/1996 | Chernack et al. | 434/272 |
| 5,997,307 | A | * | 12/1999 | LeJeune, Jr. | 434/262 |
| 6,241,526 | B1 | * | 6/2001 | Auran et al. | 434/270 |
| 6,485,308 | B1 | * | 11/2002 | Goldstein | 434/267 |
| 6,568,941 | B1 | * | 5/2003 | Goldstein | 434/267 |
| 6,780,016 | B1 | * | 8/2004 | Toly | 434/262 |
| 7,621,749 | B2 | * | 11/2009 | Munday | 434/262 |
| 2001/0008756 | A1 | * | 7/2001 | Auran et al. | 434/270 |
| 2006/0223039 | A1 | * | 10/2006 | Williams | 434/262 |
| 2008/0050710 | A1 | * | 2/2008 | Cottler et al. | 434/270 |

* cited by examiner

*Primary Examiner*—Cameron Saadat
(74) *Attorney, Agent, or Firm*—Blank Rome LLP

(57) ABSTRACT

Aspects of the present invention are directed to an anatomical model for training that includes a head portion; at least one auricle portion; at least one ear canal; and at least one cartridge. The at least one cartridge may be adaptable to mimic at least one pathology of the human ear, such as an eardrum perforation, a middle ear fluid, a cholesteatoma, a tumor, or earwax.

16 Claims, 15 Drawing Sheets

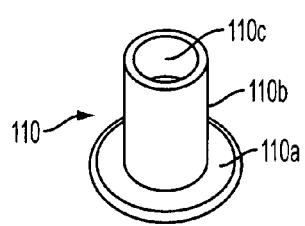 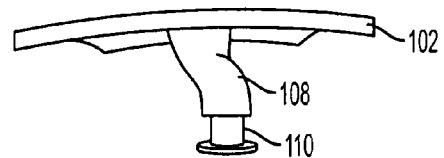
FIG. 9    FIG. 10
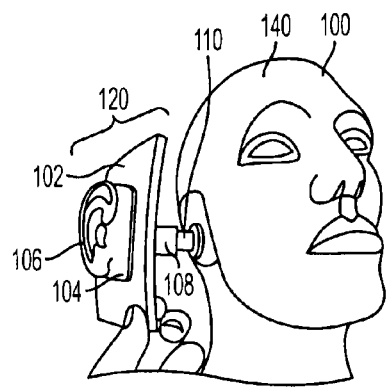 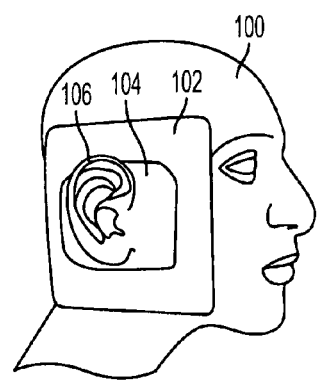
FIG. 11    FIG. 12

FRONT VIEW

SIDE VIEW

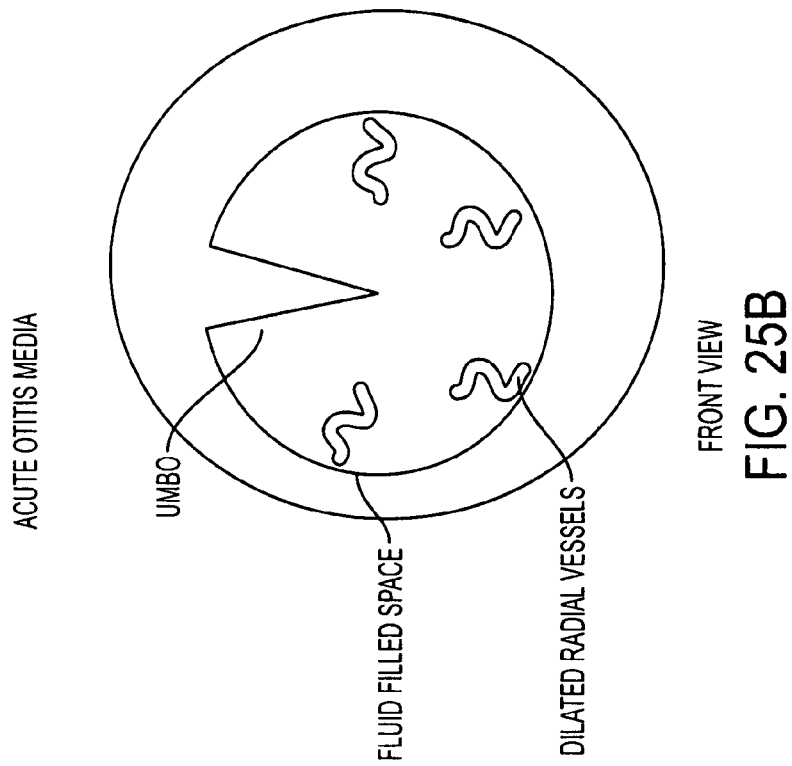
FIG. 25B FRONT VIEW
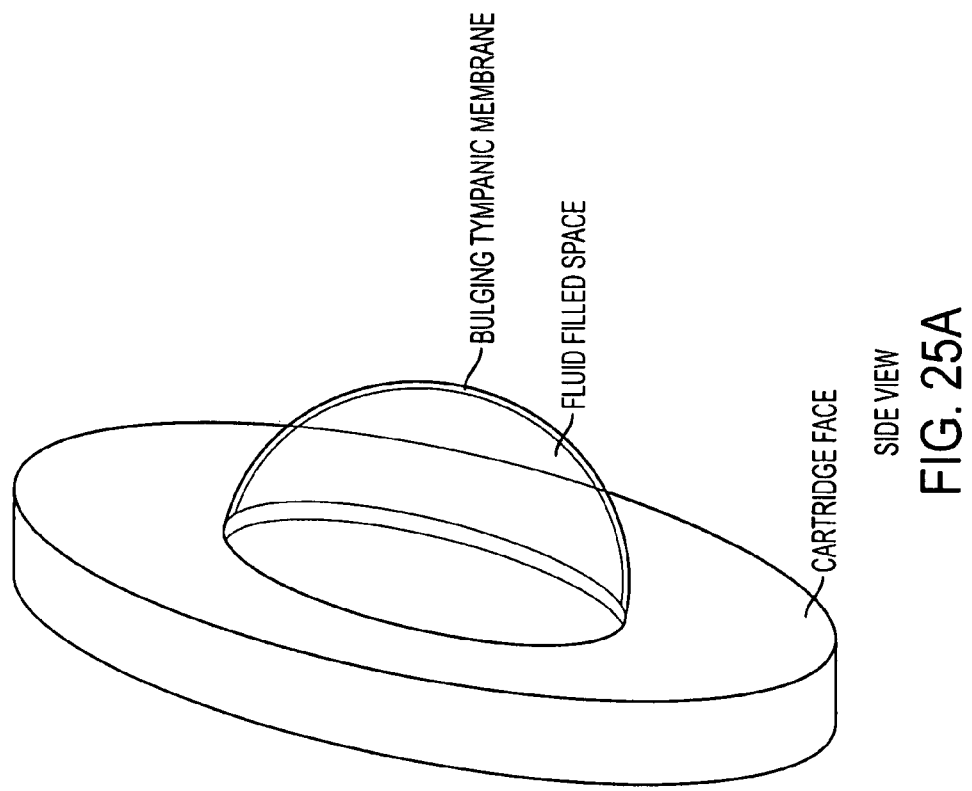
FIG. 25A SIDE VIEW

SUMMARY OF PATHOLOGIES AND CARTRIDGE SPECIFICATIONS

| PATHOLOGY | CARTRIDGE COLOR | FLUID/NO FLUID | EAR DRUM MOVEMENT WITH PNEUMATIC OTOSCOPY | RETRACTED/BULGING/NORMAL EAR DRUM |
|---|---|---|---|---|
| SEROUS OTITIS MEDIA | YELLOW | FLUID FILLED | MINIMAL MOVEMENT | RETRACTED |
| MUCOID OTITIS MEDIA | YELLOW | FLUID FILLED | MINIMAL MOVEMENT | RETRACTED |
| ACUTE OTITIS MEDIA | RED | FLUID FILLED | MINIMAL MOVEMENT | BULGING, VASODILATION OF RADIAL VESSELS |
| CHOLESTEATOMA | FLESH | NO FLUID | THIS CONDITION MAY ALTER THE MOVEMENT OF THE EAR DRUM IN VARIOUS, UNPREDICTABLE WAYS | NORMAL TO BULGING |
| TEAR IN THE EARDRUM | FLESH | NO FLUID | NO MOVEMENT | NORMAL |
| TYMPANOSCLEROSIS | FLESH | NO FLUID | THIS CONDITION MAY ALTER THE MOVEMENT OF THE EAR DRUM IN VARIOUS, UNPREDICTABLE WAYS | NORMAL |
| NORMAL | FLESH | NO FLUID | MOVEMENT | NORMAL |

FIG. 26

ANATOMICAL MODEL AND METHOD FOR MEDICAL TRAINING

CLAIM TO PRIORITY

This application claims priority to U.S. Provisional Patent Application Ser. No. 60/831,393, filed Jul. 17, 2006, the entire content of which is incorporated herein by reference.

BACKGROUND OF THE INVENTION

There are a number of pathologies that can occur in the human ear canal and middle ear space. Generally, these pathologies include but are not limited to eardrum perforation, the presence of middle ear fluid, cholesteatoma, tumors, and the presence of unwanted earwax. These five categories represent umbrella characterizations under which many variations of the individual pathology exists. At present, it is very difficult to train new doctors and medical students to diagnose these pathologies, because no training model or effective technique exists.

Additionally, ear surgeries are common throughout the United States. For example, the placement of pressure equalization (PE) tubes into the tympanic membrane of the ear is one of the most commonly performed surgical procedures in the United States. Typically, 1.05 million PE tubes are placed in a given year. However, in the past, the only reliable method of training surgeons to perform these procedures was for a surgeon to practice on an actual patient under the supervision of a more experienced surgeon. As a result, an inexperienced surgeon could cause irreparable harm to a patient if he made a mistake during his training.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 illustrates an exemplary cartridge;

FIG. 10 illustrates an exemplary cartridge and a portion of an exemplary ear canal;

FIG. 11 illustrates a partially assembled exemplary training module;

FIG. 12 illustrates a side view of an exemplary training module;

FIG. 25A illustrates a convex membrane;

FIG. 25B illustrates an accumulation of fluid behind the convex membrane in the middle ear space;

FIG. 26 illustrates a table including non-limiting examples of pathology summaries and cartridge specifications.

SUMMARY OF THE INVENTION

Figure 1:
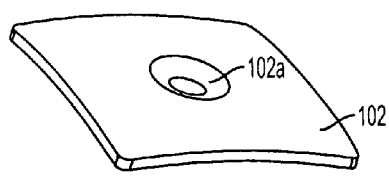
FIG. 1 illustrates a non-limiting example of a portion of an ear canal.

In light of the difficulties of the background art, the present inventors developed the present invention. To this end, a first aspect of the invention provides an anatomical model for training, including: a head portion; at least one auricle portion adapted to be detachably attached to the head portion; at least one ear canal adapted to be interchangeably connected to the at least one auricle portion; and at least one cartridge adapted to be removably inserted into the at least one ear canal.

A second non-limiting aspect of the invention provides an anatomical model for training, which includes: a head portion; at least one auricle portion adapted to be detachably attached to the head portion; at least one ear canal adapted to be interchangeably connected to the at least one auricle portion; and at least one means for simulating a pathology adapted to be removably inserted at the at least one ear canal.

DESCRIPTION OF THE EMBODIMENTS

Non-limiting aspects of the present invention will now be described with reference to the accompanying drawings, in which like reference numerals represent like elements. By way of explanation, fluid in the middle ear, otitis media with effusion (OME), affects over 2 million people a year, and it is the most common diagnosis made in pediatricians' offices. Fluid in the middle ear space applies pressure on the tympanic membrane and can cause undesirable symptoms, such as pain, hearing loss, speech and language delays, and structural damage to the tympanic membrane, as well as damage to other structures vital to the processing of sound information. To relieve this pressure and drain the fluid, the surgeon often makes an incision into the tympanic membrane (called a myringotomy), aspirates the fluid, and places a PE tube in the membrane incision. The tympanic membrane heals around the PE tube, and this opening between the middle ear and the ear canal ventilates the middle ear space.

Although PE tube placement is the most commonly performed surgical procedure in the United States, there currently exists no simulator model upon which surgeons may learn by practicing the procedure. Rather, otolaryngologists and other surgeons learn how to insert PE tubes by performing the operation on patients in the operating room while under the supervision of a more experienced doctor. While some models exist, none are cost effective, easy to maintain, or realistic. See, e.g., U.S. Pat. No. 6,241,526; U.S. Pat. No. 5,997,307; and U.S. Pat. No. 2,778,125, the entire contents of each of which are herein incorporated by reference.

In light of these difficulties, non-limiting aspects of the present invention provide, among other things, an anatomically correct model of the auricle and external ear canal (collectively, "the canal component"); a replaceable and interchangeable device that simulates the tympanic membrane and middle ear space, including the ability to simulate different pathologies that may occur in the ear (collectively, "the cartridge"); and a model of a human head, which may be detachably detached to a pair of model shoulders.

To this end, a first non-limiting aspect of the invention provides an anatomical model 100 of a human head, illustrated, for example, in FIGS. 6, 11, 12, 14, and 15-18. Detachably attached to the model 100 may be an ear canal surface portion 102. Ear canal 108 protrudes from surface portion 102 into an interior of the head 100.

Throughout this description, it should be understood that the cartridge 110, the canal 108 and the auricle 106 have been illustrated in generic forms. However, any modification of any one of these elements may be substituted into combinations with other elements. For example, the cartridge 110 may be modified to exhibit any one of the pathologies known to those of skill in the art.

In the illustrated examples, the head 100 is an anatomically correct child sized model. However, depending on a desired surgery or diagnosis, other models may be used and are within the scope of the present invention. If desired, it is also possible to use adult sized ear canals and cartridges in a child sized head to minimize costs. In other words, it is possible to use an adult ear, ear canal, and cartridge in a child sized head (or vice versa). In this way, it is possible to minimize costs by using a single sized head for multiple sized ears, canals, and cartridges.

Benefits of this and other non-limiting aspects of the invention include the ability for surgeons to position the speculum in the external auditory meatus and lateral ear canal, which is an important first step in several surgical procedures. The present invention provides an accurate representation of the aurical and tragus with regard to size, feel, texture, and flexibility. These simulated external structures teach the surgeon proper speculum placement for maximizing visualization of the tympanic membrane.

Additionally, non-limiting aspects of the invention accurately reproduce the shape and dimensions of the external ear canal. This enables surgeons to learn how to move instruments into and out of the ear canal without harming the patient. Aspects of the present invention also enable the surgeon to adjust the model head in a manner similar to that which would occur during surgery, which enables the surgeon to practice more accurately.

The present invention also enables physicians to practice techniques for ear wax removal. The present invention, through its accurate anatomical representations, enables improved ear wax removal techniques.

Additionally, according to certain non-limiting aspects of the invention, the tympanic membrane, located in the cartridge, more accurately simulates properties of the human eardrum. It is possible to vary the characteristics exhibited by the cartridges, as shown in FIGS. 19-27. By varying the cartridge characteristics, it is possible to improve doctors' abilities to render accurate diagnoses. Since each cartridge mimics a different pathology, every different pathology of the human ear may be diagnosed, which leads to increased physician accuracy.

To improve physician accuracy, the cartridges may be varied in a number of different ways. By way of non-limiting example, fluid may be placed behind the membrane in the middle ear space that is mimicked by the cartridge (see, e.g., element 110C). Additionally, it is possible to alter properties of the membrane to mimic other symptoms.

As noted above, it is possible to simulate middle ear fluid. The fluid may be changed to reflect variability in viscosity, color, and volume of human ear fluid (otitis media with effusion). As an example, it is possible to inject or to pour fluid into the cartridge before the membrane is fixed to the cartridge (e.g., using a glue or other adhesive). An example of middle ear fluid may be seen in FIG. 23, in which a red fluid 2300 has been placed into the middle ear space of the cartridge 110 and sealed behind the membrane. The fluid may include any combination of or individual solution of water, saline, polymer (having various viscosities), hydrogel, or another suitable material known to those of skill in the art that is adapted to mimic different types of middle ear fluid. Generally, these fluids may range from a thin, watery liquid to a thick, viscous, glue-like fluid.

Figure 20:
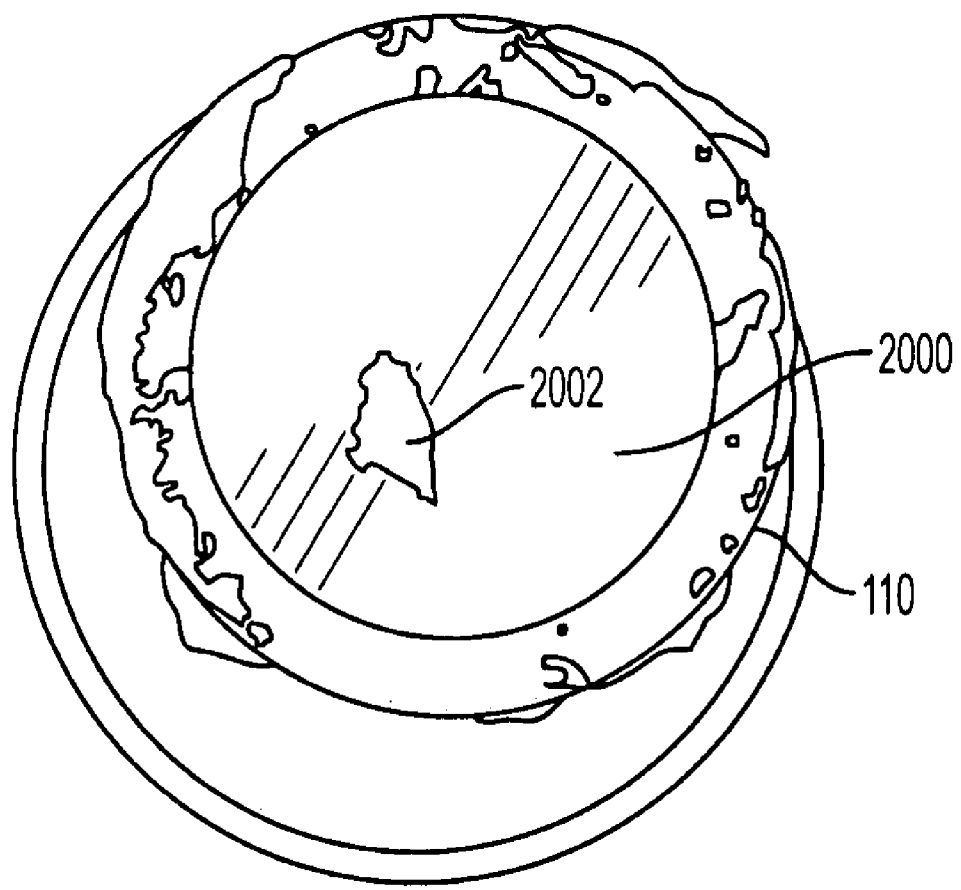
FIG. 20 illustrates an exemplary cartridge adapted to simulate a perforation in the eardrum.

The membrane (e.g., membrane 1900) may also be adapted to mimic various pathologies. For example, it is possible to make a hole in the membrane, as illustrated in FIG. 20. It is also possible to affix a non-regular shaped piece of material that mimics a cholesteatoma (e.g., the white glob in FIG. 21). For example, the material may be affixed to the membrane using a glue or other suitable method. The material may include silicone, wax, plastic, or other suitable material, either alone or in combination.

The membrane may also be altered by creating a vacuum in the middle ear space, thereby causing the membrane to retract inward. The vacuum may be created by inserting a vacuum hose through a hole in the cartridge (illustrated, for example, in FIG. 27). Of course, other methods of creating a vacuum, as known to those of skill in the art, are within the scope of the present invention.

It is also possible to pressurize or inflate the middle ear space in the cartridge, thereby causing the membrane to protrude outward. An exemplary method of pressurizing the inner ear space is to fill the middle ear space with air using a hole in the cartridge (see, e.g., FIG. 27). Inflation of the membrane is achieved in a manner similar to inflating a balloon. Once the membrane is inflated, a plug or other suitable device may be used to prevent air leakage from the cartridge. Other methods of inflation known to those of skill in the art are also within the scope of the present invention.

Figure 3:
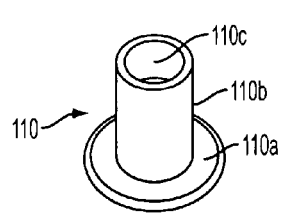
FIG. 3 illustrates an exemplary cartridge.

FIG. 3 provides an illustrative non-limiting example of a cartridge 110 according to the present invention. The cartridge 110 is a basic cartridge, and has not been modified to exhibit the characteristics of any particular pathology. To exhibit a pathology, the interior 110c of the cartridge may be modified to include various obstructions, as will be described in more detail below. The cartridge 110 also includes base portion 110a which is preferably configured to enable a user to remove the cartridge from the ear canal 108 with little difficulty. Shaft 110b may have an adjustable diameter, if desired, to mimic various pathologies and/or human dimensions.

Figure 2:
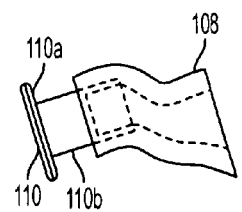
FIG. 2 illustrates another exemplary portion of an ear canal detachably attached to an exemplary cartridge.

FIG. 2 is a non-limiting example of a cartridge 110 detachably inserted into canal portion 108. As can be seen from the figure, it may be preferable to configure surfaces 110a and 110b such that the user may easily insert and remove the cartridge 110 from the canal portion 108.

Figure 4:
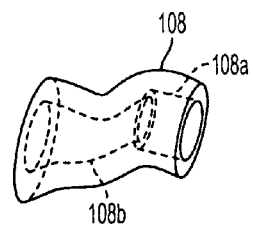
FIG. 4 illustrates a portion of an exemplary ear canal.

As shown in FIG. 4, the insertability of the cartridge 110 may be improved by adapting the canal portion 108. In particular, it is possible to adapt a first inner portion 108a of the canal portion 108 to optimally receive the cartridge 110. It is also possible, as illustrated in FIG. 4, to adjust a second inner portion 108b of the canal portion 108 to mimic various anatomical features and/or pathologies.

In the embodiments described herein, the following materials may be used (as non-limiting examples) to make each component. Auricle 106 may be made from silicone, rubber, or other type of soft, elastic, pliable polymer. It may be desirable to select a material for the auricle that mimics the soft, elastic skin and cartilage of the human auricle.

Element 104, which provides support for the auricle may be made from any one of (or a combination of), as non-limiting examples: silicone, rubber, or other soft, elastic, pliable polymer. The size of the support 104 may also be adapted as desired—there is no specific size required.

Figure 8:
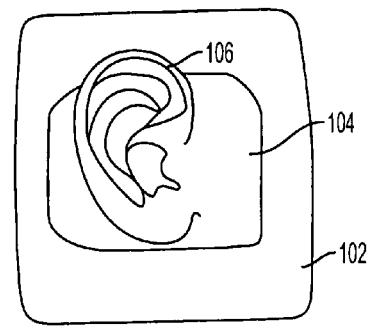
FIG. 8 illustrates an exemplary auricle and ear canal portion.

Surface portion 102 may be made, for example, of a stiff rubber, metal, or plastic (alone or in combination). In the example of FIG. 8, ABS plastic was used, but is not required. It may be beneficial for the surface portion 102 to be strong and/or firm, to enable a user to detach the auricle and its mount from the head to easily access the cartridge. In the non-limiting example of FIG. 8, the surface portion 102 extends approximately 2 inches beyond the auricle. However, the size of the surface portion 102 is not so limited, and may be made smaller or larger, as desired. Surface portion 102 may be adapted to enable coupling of the auricle to the head.

The head 100 may be made of plastic, metal, or other suitable material. In one non-limiting example, the head may be made of PVC plastic having approximately a quarter inch thickness.

The canal portion 108 may be made of any suitable material, such as plastic, metal, rubber (such as, for example, a stiff rubber), or other material known to those of skill in the art. A factor that may be considered when selecting a material for canal portion 108 is that the material may be hard and not easily bendable, which mimics the bony ear canal.

To make the cartridge 110, it is possible to use plastic, metal, rubber (e.g., a stiff rubber), or other suitable material. In the example shown in FIG. 9, ABS plastic was used to make the cartridge 110. It may be preferable to select the material for the cartridge 110 based on the durability of the material, as the cartridge will be repeatedly inserted and removed from the canal portion 108 during the lifetime of the model, which will cause compression force and tension force, respectively. Additionally, it is possible to vary the colors of different cartridges, to differentiate between diseased and healthy models. For example, a red, black, or blue cartridge may mimic a diseased middle ear space, while a white cartridge may mimic a healthy middle ear space. Red may represent an inflamed area, while black may represent necrotic tissue. (Of course, these are only examples meant to illustrate that it is possible to characterize the cartridges by colors or by other indicators known to those of skill in the art.) It may also be desirable to select a material that is capable of holding a fluid tight seal and an air tight seal with the canal portion 108.

Figure 19:
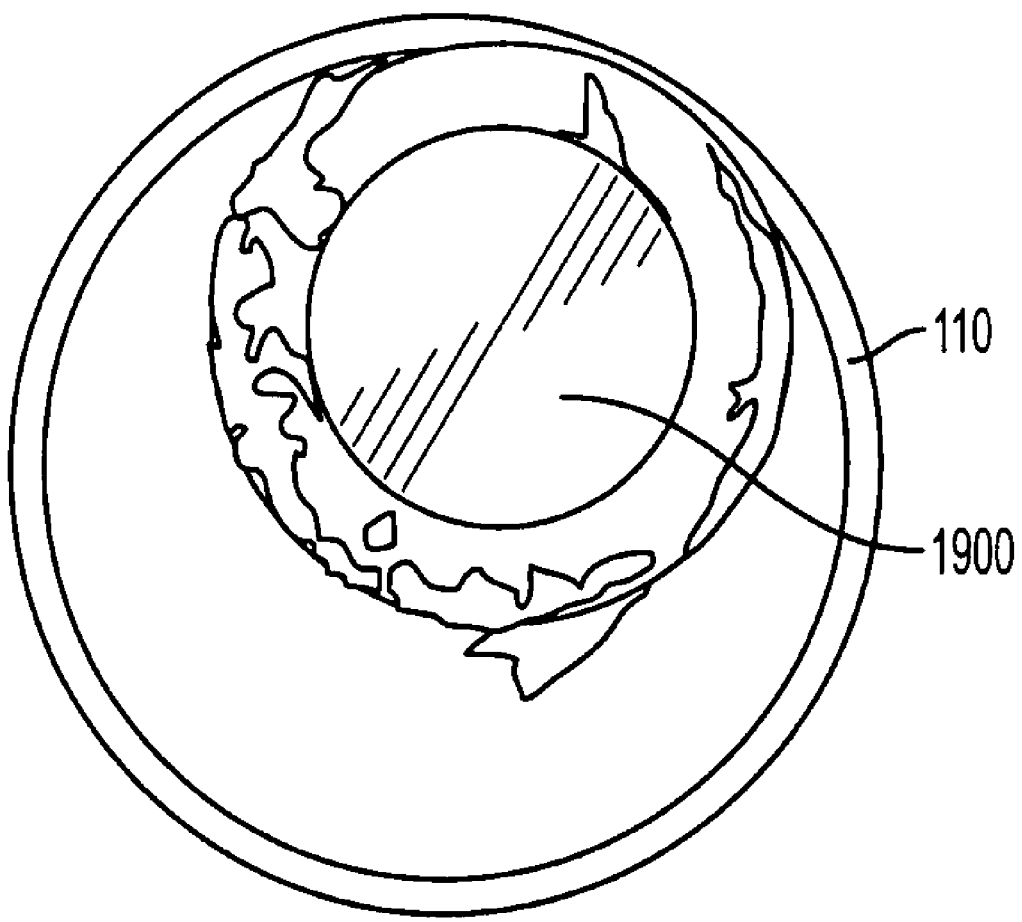
FIG. 19 illustrates an exemplary cartridge adapted to simulate a healthy eardrum.

The membrane 1900 may be made of, for example, a transparent, translucent, or opaque plastic, as well as from other suitable materials. The membrane may be thin (e.g., less than about 1 mm thick), which enables the membrane to mimic a human tympanic membrane. Moreover, it may be desirable for the membrane 1900 to have elastic properties. In the example of FIG. 19, the membrane was obtained from a very thin plastic bag, similar to a produce bag from a grocery store. Generally, standard Ziploc® bags were too thick, and membranes made from latex gloves were too elastic for the purposes described in the specific examples herein, however, those materials may be suitable for other pathologies and are within the scope of this invention. Other materials that may be considered include fabrics (e.g., silk, cotton, nylon, etc.), latex, plastic, leather (modified in various ways, such as thinned and sanded), tissues harvested from other animals (e.g., the skin, subcutaneous tissue, mesentery of rats and mice), paper (e.g., filter paper, thin paper, thick paper).

Figure 5:
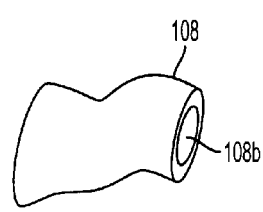
FIG. 5 illustrates a portion of another exemplary ear canal.
Figure 6:
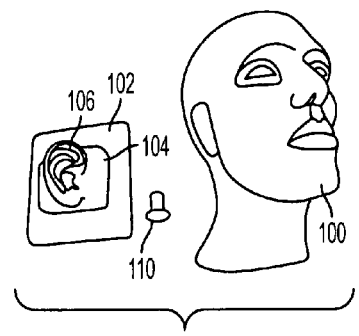
FIG. 6 illustrates a disassembled exemplary training module.
Figure 7:
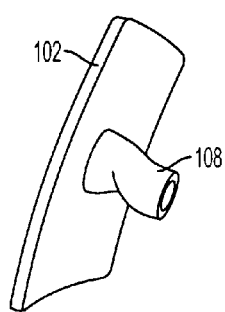
FIG. 7 provides a partial view of a portion of an ear canal.

FIG. 5 provides an alternative illustration of a non-limiting canal portion of the present invention. As further shown in FIG. 7, the canal portion 108 can be permanently or temporarily attached to surface portion 102. The supportive base of the auricle portion 104 may be affixed, either permanently or temporarily (as desired) to the surface portion 102. The surface portion 102 is ultimately detachably attached to the head 100 by Velcro or other suitable means.

FIG. 10 illustrates an exemplary canal portion 108 into which a cartridge 110 has been removably inserted. In FIG. 10, the cartridge 110 is a non-limiting exemplary cartridge. As explained above, the cartridges may be modified to mimic a number of different pathologies.

Figure 13:
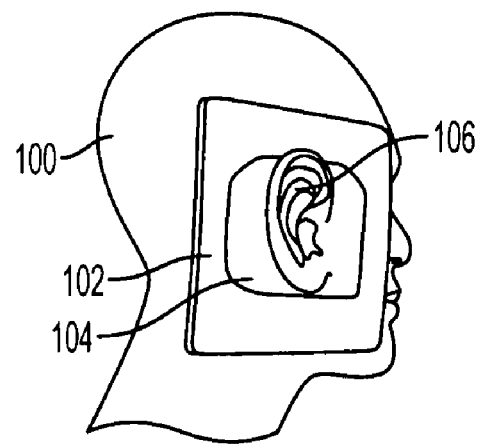
FIG. 13 illustrates another side view of an exemplary training module.
Figure 14:
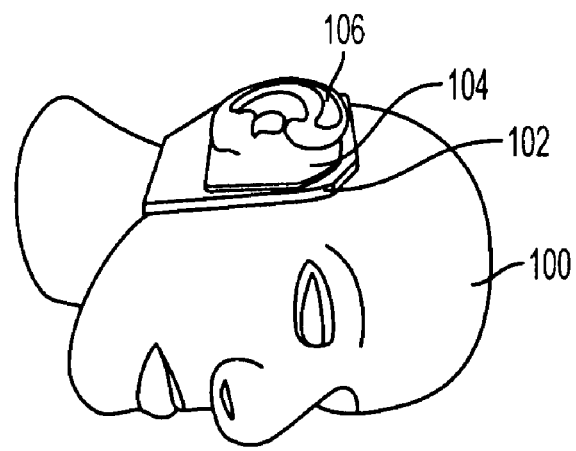
FIG. 14 presents yet another side view of an exemplary training module.

FIG. 11 illustrates an exemplary model 100 with the ear assembly portion 120 (cartridge 110, canal 108, ear canal surface portion 102 and auricle 106) removed. FIG. 12 illustrates a profile view of the exemplary ear assembly portion of FIG. 11 after insertion into the hole 140 in the model head 100. Likewise, FIGS. 13 and 14 illustrate different views of the same exemplary model head 100 with the ear assembly portion 120 inserted.

Figure 15:
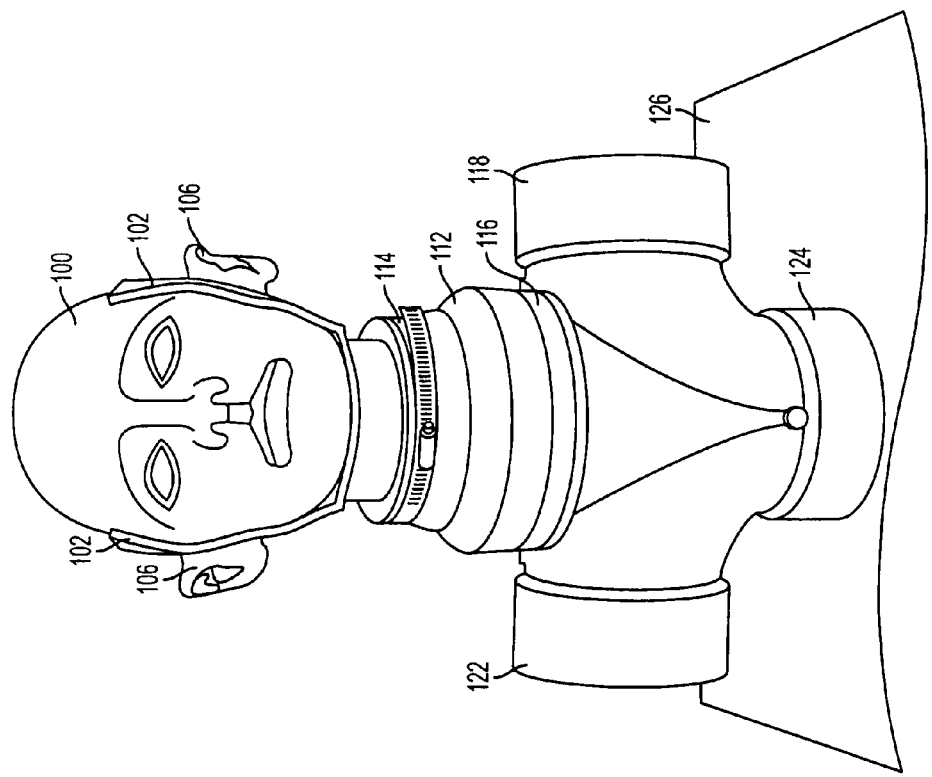
FIG. 15 illustrates a partial side view of an exemplary training module with shoulders.
Figure 16:
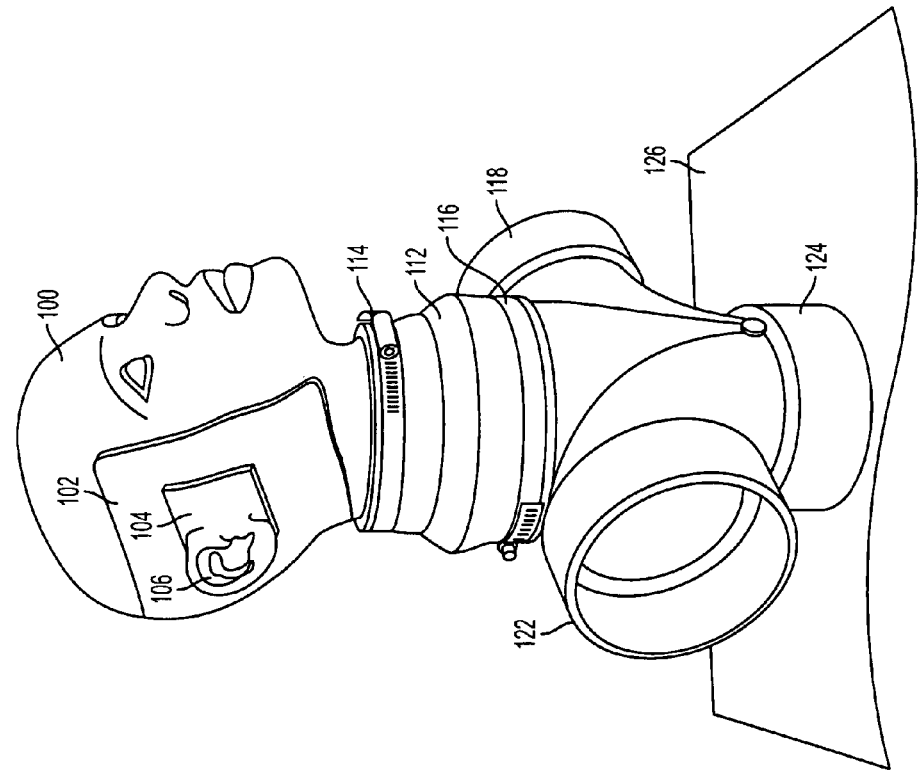
FIG. 16 illustrates a frontal view of an exemplary training module with shoulders.

FIGS. 15 and 16 illustrate yet another exemplary configuration of the invention. In the illustrations of FIGS. 15 and 16, model head 100 is detachably attached to shoulders 118 and 122. For ease of use, the shoulders rest on base 124, which is situated on table 126. Table 126 is shown for illustrative purposes only, and is not limiting of the invention. Other suitable surfaces known to those of skill in the art are within the scope of the present invention.

As shown in FIGS. 15 and 16, shoulders 122 and 118 are made from PVC piping in this non-limiting example. However, other suitable materials are within the scope of the present invention. Neck 112 is secured to the model head 100 using fasteners 114 and 116. While tension fasteners are shown in this example, other ways of securing the head to the neck portion and the neck portion to the shoulders are within the scope of the invention.

Figure 18:
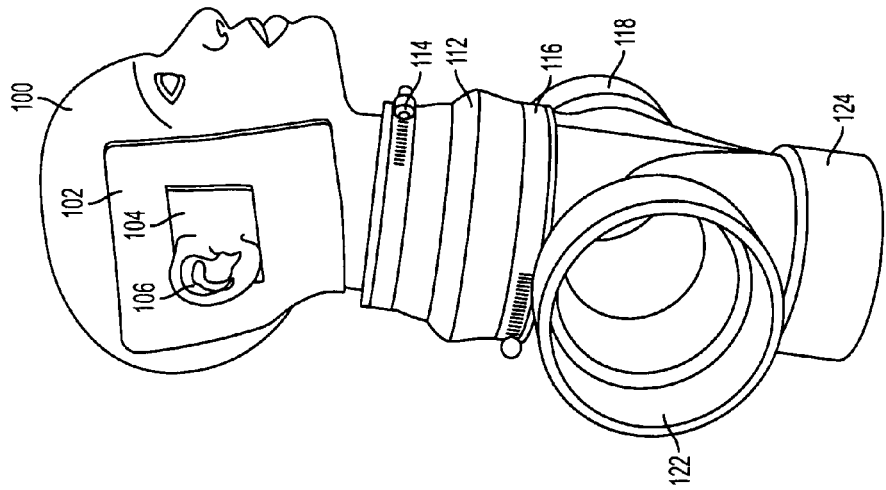
FIG. 18 also illustrates the adjustability of the model head.
Figure 17:
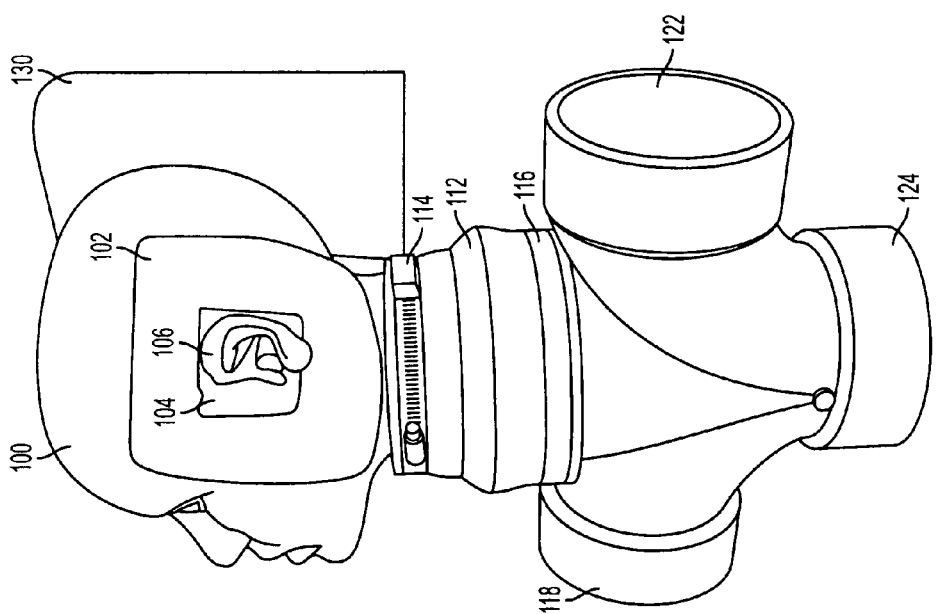
FIG. 17 illustrates the adjustability of the model head.

FIGS. 17 and 18 provide yet further non-limiting examples of the present invention. In FIG. 17, the model head 100 is depicted resting on a surgical pillow 130. As can be seen in FIG. 17, it is possible for a surgeon to adjust the positioning of the model head 100 in a manner similar to that desired during surgery. FIG. 18 provides a non-limiting alternative positioning of the head 100 for surgery or diagnosis.

For example, FIG. 19 illustrates a cartridge 110 adapted to mimic the characteristics of a normal eardrum. The cartridge also has a thin membrane 1900 detachably attached to a top surface.

FIG. 20 illustrates another exemplary embodiment of a cartridge adapted to mimic a torn or ruptured tympanic membrane. As shown in FIG. 20, the membrane 2000, which is affixed to the cartridge 110 by superglue, includes a hole 2002. Generally, the hole may be any size, as a variety of different perforation sizes are observed in a clinical setting. In this example, the hole is approximately 3 mm and was made with a scalpel blade. Other suitable methods of making the hole are within the scope of the present invention.

Figure 21:
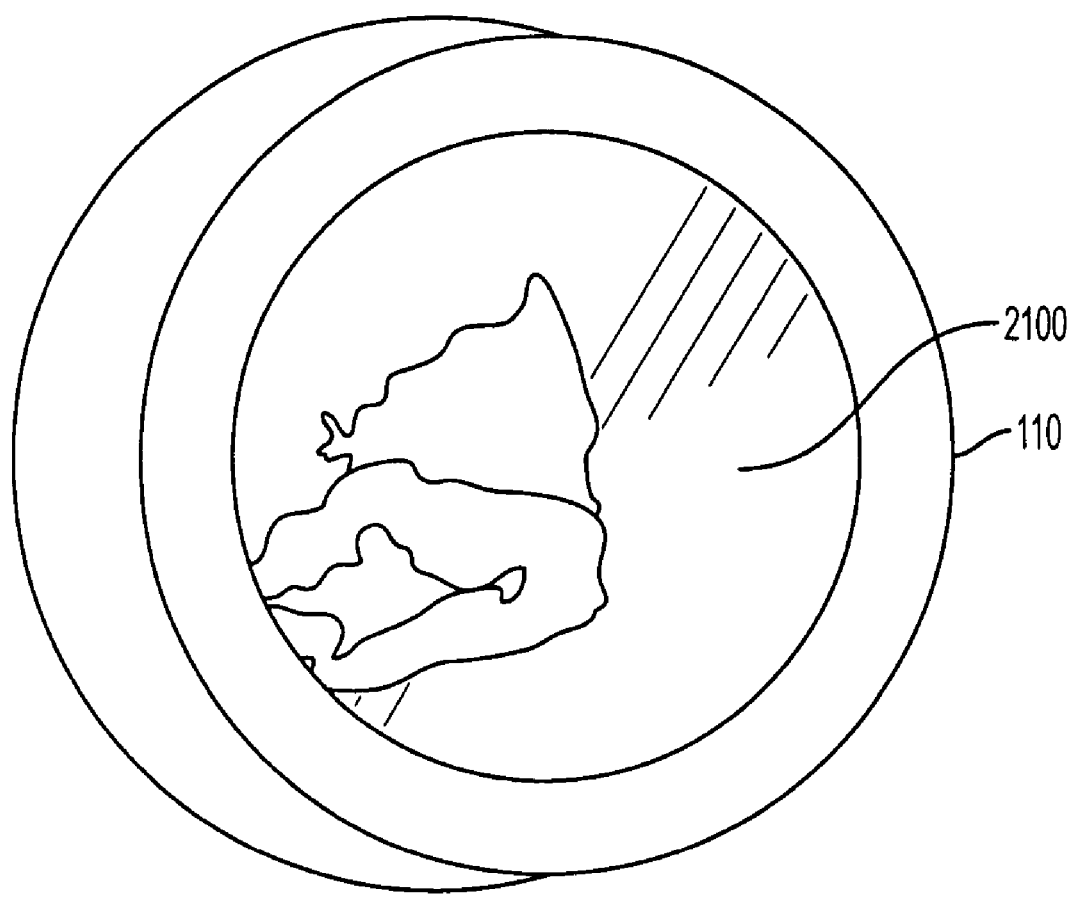
FIG. 21 provides a non-limiting illustration of a cartridge adapted to portray cholesteatoma.

Another example of a modified cartridge 110 is illustrated in FIG. 21. This cartridge 110 has been modified to mimic the symptoms of cholesteatoma. The cyst or pouch of cholesteatoma may be mimicked by affixing a piece of irregularly shaped material to the membrane 2100, as described above. In this example, air is behind the membrane 2100 in the cartridge 110. However, it is also possible to have a fluid behind the membrane 2100 in the cartridge 110.

Figure 22:
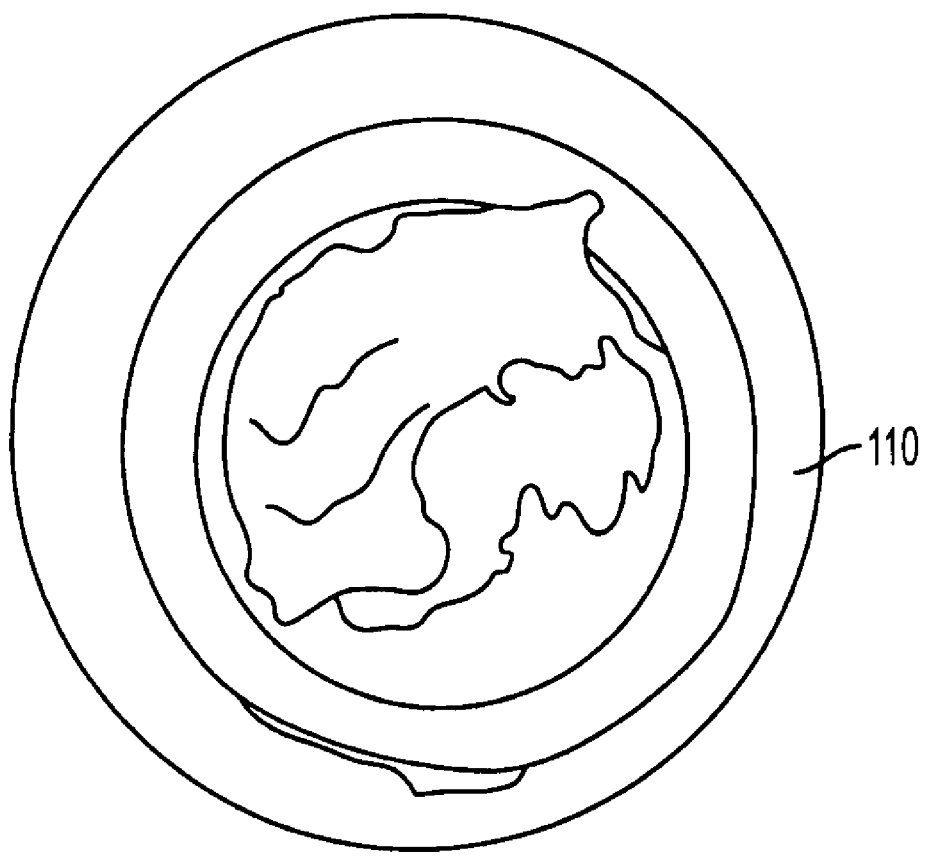
FIG. 22 illustrates an exemplary cartridge adapted to portray tympanosclerosis.

FIG. 22 provides an illustration of an exemplary cartridge 110 modified to mimic tympanosclerosis, which is a form of scar tissue in the membrane produced by hyalinization. Generally, tympanosclerosis is caused by chronic inflammation or trauma, and is often associated with the insertion of PE tubes. Inside the cartridge 110 is a smear or glob of silicone, which is mimicking the tympanosclerosis.

Figure 23:
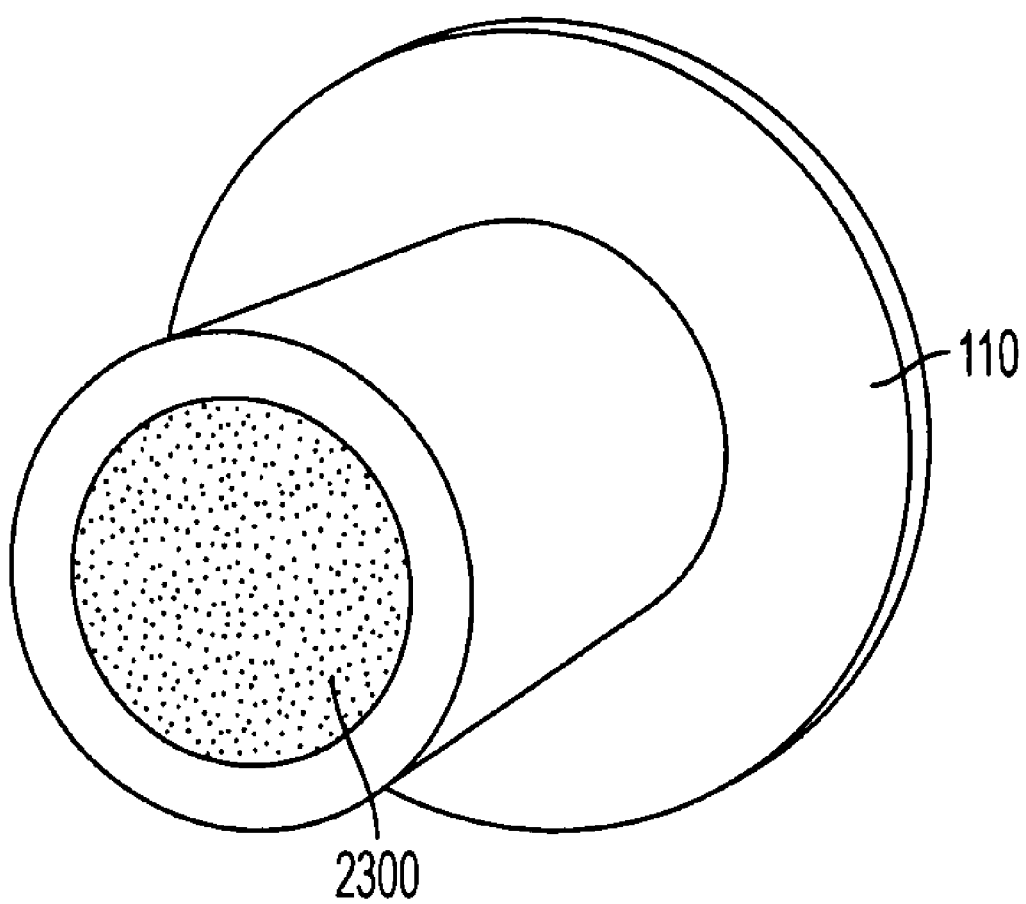
FIG. 23 provides a non-limiting illustration of a cartridge adapted to mimic fluid in the middle ear space for serous, mucoid, and acute otitis media.

FIG. 23 illustrates a cartridge 110 adapted to mimic fluid in the middle ear space for serous, mucoid, and acute otitis media. As shown in FIG. 23, water, saline, polymer (of various viscosities), hydrogel, or another suitable material may be used to mimic different types of middle ear fluid. The fluid may also be colored (e.g., using food coloring, paint, dye, or other suitable coloring source). It is also possible to modify the amount of fluid contained within a cartridge.

Figure 24B:
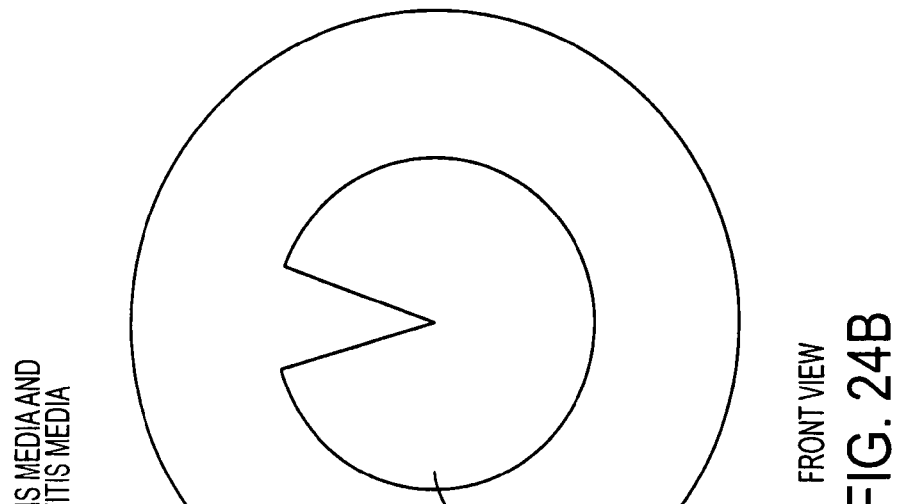
FIGS. 24A and 24B provide a side view and a front view, respectively, of the cartridge membrane.
Figure 24A:
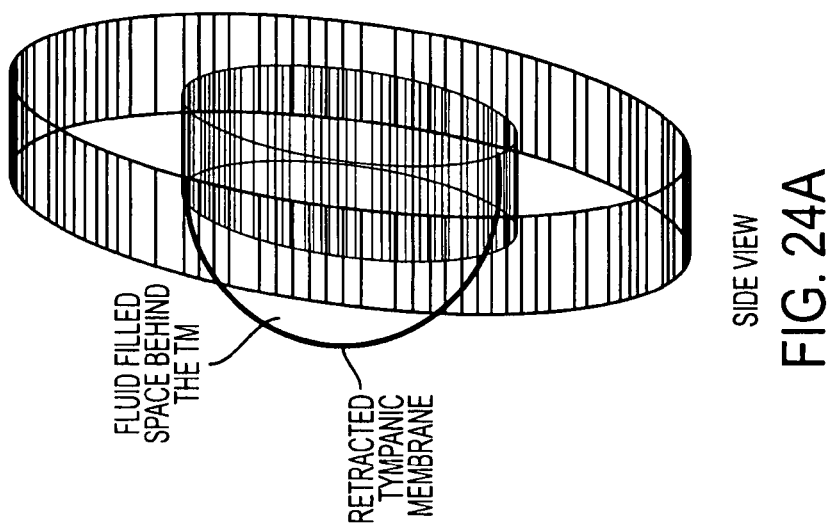

FIGS. 24A and 24B provide a side view and a front view, respectively, of an exemplary cartridge membrane. FIG. 24A illustrates a membrane that has been retracted into the cartridge space that mimics the middle ear, which causes the model to mimic a concave membrane. FIG. 24B illustrates a front view, showing fluid buildup behind the membrane.

FIG. 25A provides a non-limiting example of a membrane protruding away from a middle ear space of the cartridge, which mimics a convex membrane. FIG. 25B illustrates an accumulation of fluid behind the convex membrane in the middle ear space. It also illustrates exemplary mimicking of dilated and protruding blood vessels on the surface of the membrane.

FIG. 26 provides a chart that summarizes exemplary pathologies and corresponding exemplary cartridge specifications. Vasodilation may be simulated by drawing or painting blood vessels on the membrane, for example. Other techniques are also within the scope of this invention.

Figure 27:
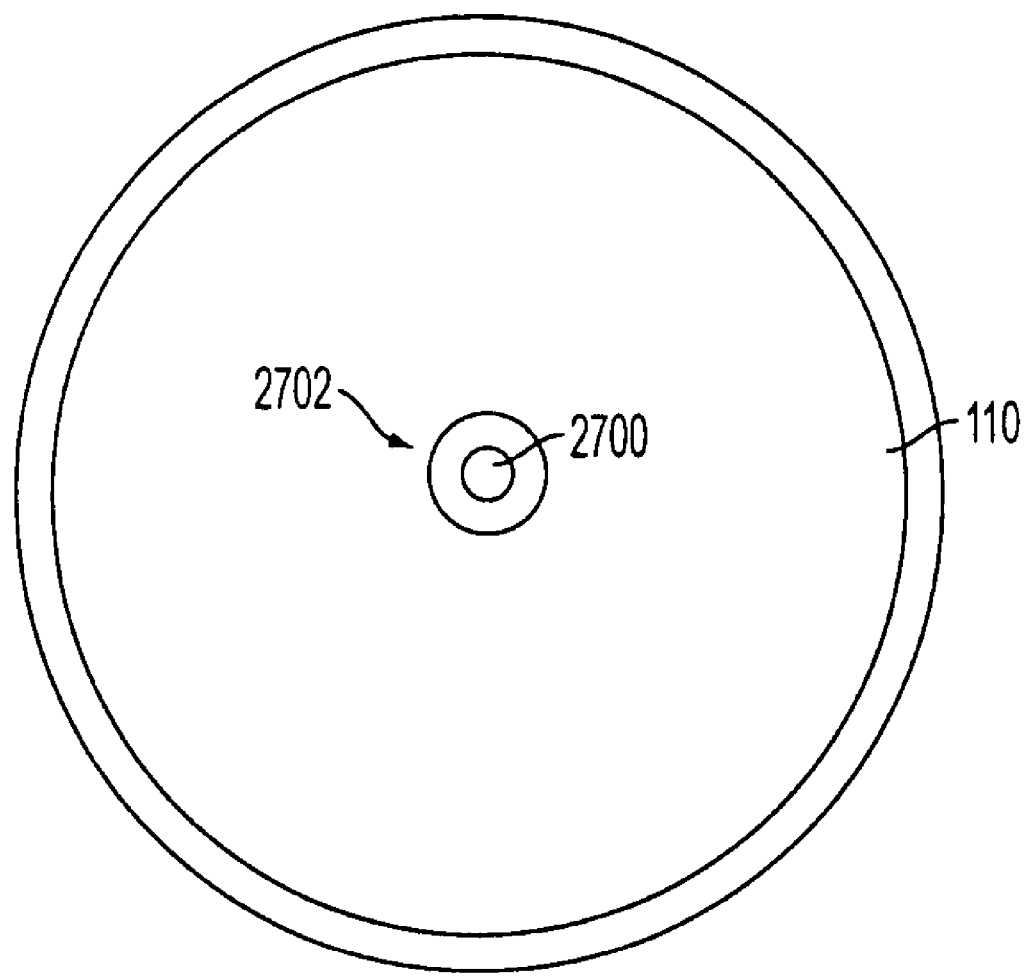
FIG. 27 illustrates a non-limiting example of a cartridge adapted to mimic serous, mucoid, and acute otitis media.

FIG. 27 provides an illustration of an exemplary cartridge 110 modified to include hole 2700. The hole 2700 enables air to flow out of the cartridge during pneumatic otoscopy. This configuration enables the tympanic membrane to move slightly, thereby mimicking the normal physiology of the middle ear space and Eustachian tube. Depending on the condition selected for simulation, the hole size, shape, and position may be varied as desired. The hole 2700 may be crafted, for example, using a drill and drill bit (not pictured). The hole 2700 has edge 2702. While the edge 2702 in FIG. 27 is shown as raised, a flat edge or an inverted edge are also within the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An anatomical model for training, comprising:
   a head portion;
   at least one auricle portion adapted to be detachably attached to the head portion;
   at least one ear canal adapted to be interchangeably connected to the at least one auricle portion; and
   at least one cartridge adapted to be removably inserted at the at least one ear canal, the cartridge having a membrane and an interior portion disposed behind the membrane according one of the following:
   wherein the interior portion is configured so a vacuum can be created to cause the membrane to retract inward and that can be pressurized to cause the membrane to bulge outward,
   wherein the interior portion includes a fluid disposed therein and the membrane is configured to receive an incision that allows the fluid to drain from the interior portion and that holds a pressure equalization tube in the incision, and
   wherein the membrane is configured with one more openings so air can flow out of the interior portion during pneumatic otoscopy such that the membrane will move a detectable amount during said pneumatic otoscopy.

2. The anatomical model according to claim 1, wherein the membrane is configured to simulate a tympanic membrane and the interior portion is configured to simulate a middle ear space, the membrane and interior portion being adaptable to mimic two or more pathologies.

3. The anatomical model according to claim 2, wherein the two or more pathologies are chosen from an eardrum perforation, a middle ear fluid, a cholesteatoma, a tumor, a retracted eardrum, a bulging eardrum, tympanosclerosis, and earwax.

4. The anatomical model according to claim 1, further comprising shoulders detachably attached to the head portion.

5. The anatomical model according to claim 4, wherein the head is adapted to rotate relative to the shoulders.

6. The anatomical model according to claim 5, wherein the shoulders are detachably attached to the head portion via a neck portion.

7. The anatomical model according to claim 5, wherein the membrane is detachably attached to the at least one cartridge.

8. The anatomical model according to claim 7, wherein the membrane is made, at least in part, of at least one plastic.

9. The anatomical model according to claim 1, wherein the at least one auricle is made at least in part of at least one of at least one silicone, at least one rubber, or at least one polymer.

10. The anatomical model according to claim 1, wherein the at least one auricle portions includes at least one base portion comprised at least in part of at least one of at least one silicone, at least one rubber, or at least one polymer.

11. The anatomical model according to claim 1, wherein the head portion is made at least in part of at least one plastic.

12. The anatomical model according to claim 1, wherein the at least one cartridge is adapted to receive at least one fluid in the interior portion.

13. The anatomical model according to claim 12, wherein the fluid includes at least one of water, saline, at least one polymer, or at least one hydrogel.

14. An anatomical model for training, comprising:
    a head portion;
    at least one auricle portion adapted to be detachably attached to the head portion;
    at least one ear canal adapted to be interchangeably connected to the at least one auricle portion; and at least one device for simulating two or more pathologies that is adapted to be removably inserted at the at least one ear canal, the device having a membrane and an interior portion disposed behind the membrane according one of the following:
    wherein the interior portion is configured so a vacuum can be created to cause the membrane to retract inward and that can be pressurized to cause the membrane to bulge outward, wherein the interior portion includes a fluid disposed therein and the membrane is configured to receive an incision that allows the fluid to drain from the interior portion and that holds a pressure equalization tube in the incision, and wherein the membrane is configured with one more openings so air can flow out of the interior portion during pneumatic otoscopy such that the membrane will move a detectable amount during said pneumatic otoscopy.

15. The anatomical model according to claim 14, wherein the two or more pathologies are chosen from an eardrum perforation, a middle ear fluid, a cholesteatoma, a tumor, a retracted eardrum, a bulging eardrum, tympanosclerosis, and earwax.

16. The anatomic model according to claim 14, wherein the membrane is configured to simulate a tympanic membrane and the interior portion is configured to simulate a middle ear space.

* * * * *